United States Patent [19]

Ikola et al.

[11] Patent Number: 5,314,523

[45] Date of Patent: * May 24, 1994

[54] METHOD FOR REMOVING A MARGINAL ZONE EXTERNAL OF AN OUTLINE CUT IN A GLASS SHEET

[75] Inventors: Kimmo J. Ikola, Kangasala; Kimmo E. Stenman, Tampere, both of Finland

[73] Assignee: Tamglass Engineering OY, Finland

[*] Notice: The portion of the term of this patent subsequent to May 5, 2009 has been disclaimed.

[21] Appl. No.: 871,115

[22] Filed: Apr. 20, 1992

Related U.S. Application Data

[62] Division of Ser. No. 529,664, May 29, 1990, Pat. No. 5,110,340.

Foreign Application Priority Data

[30]

Jun. 9, 1989 [FI] Finland ................. 892858

[51] Int. Cl.⁵ .................. C03B 33/02; C03B 33/09
[52] U.S. Cl. .................. 65/112; 65/113; 225/2; 225/93.5
[58] Field of Search .............. 65/70, 97, 105, 112, 65/113, 174, 176, 269; 225/2, 93.5, 96.5, 97, 103

[56] References Cited

U.S. PATENT DOCUMENTS

| | | | |
|---|---|---|---|
| 3,520,457 | 7/1970 | Augustin | 225/96.5 |
| 4,033,490 | 7/1977 | Ulivi | 225/2 |
| 4,371,103 | 2/1983 | Siemens et al. | |
| 4,698,088 | 10/1987 | Bando | 65/174 |

FOREIGN PATENT DOCUMENTS

| | | |
|---|---|---|
| 315202 | 5/1989 | European Pat. Off. |
| 2240975 | 10/1973 | Fed. Rep. of Germany |

*Primary Examiner*—Joye L. Woodard
*Attorney, Agent, or Firm*—Burns, Doane, Swecker & Mathis

[57] ABSTRACT

An outline is cut in a glass sheet to form an inner zone and an outer marginal zone. The glass sheet is positioned on a support which supports the inner zone and marginal zone from below. A carrier is arranged such that suction pads thereof adhere to the inner zone, and such that a beveled bottom surface of a mechanical removing device carried by the carriage contacts an outer edge of the marginal zone. When the carriage is raised, the suction pads move up relative to the mechanical removing device. The inner zone is raised, but the outer edge of the marginal zone is restrained against upward movement by the mechanical removing device so that the marginal zone breaks along the outline.

2 Claims, 3 Drawing Sheets

METHOD FOR REMOVING A MARGINAL ZONE EXTERNAL OF AN OUTLINE CUT IN A GLASS SHEET

This application is a Divisional, of application Ser. No. 07/529,664, filed May 29, 1990, now U.S. Pat. No. 5,110,340.

BACKGROUND AND SUMMARY OF THE INVENTION

The present invention relates to a method for removing a marginal zone external of an outline cut in a glass sheet, in which method a glass sheet is carried by means of a suction-padded conveyor carriage to a marginal zone removing station, wherein the marginal zone to be removed is subjected to the action of a heating flame by means of a flame burner.

The invention relates also to an apparatus for carrying out the method. The apparatus includes a conveyor carriage fitted with ascendable and descendable suction pads and a marginal zone removing station fitted with flame burners for applying a heating flame to the marginal zone to be removed.

The currently available solutions include a flame-effected removal on the one hand and a mechanical removal on the other. In the flame-effected removal procedure, a marginal zone to be removed is first subjected to a heating flame and the corners are then cut open by sharp cutting flames. A drawback in flame-effected removal is a wide marginal zone required thereby, resulting in a large loss of glass. Another drawback is that automatization of a plurality of flame stations is complicated in mixed production. In mechanical removal, the opening of corners is effected by means of a cutting knife and it further requires the use of presses for forcing the marginal zone loose. First of all, a drawback is that two separate removing stations are required and, furthermore, this removing method is also difficult to automatize in mixed production.

An object of the invention is to provide a method and an apparatus applicable to the removal of a marginal zone in a glass sheet, which make it possible to remove a very narrow marginal zone (5-10 mm) and whose operation can be automated in a simple fashion.

This object is achieved by means of the invention on the basis of the method features set forth in the annexed claim 1 and the apparatus features set forth in claim 2.

BRIEF DESCRIPTION OF THE DRAWINGS

One embodiment of the invention will now be described in more detail with reference made to the accompanying drawings, in which.

DETAILED DESCRIPTION OF A PREFERRED EMBODIMENT OF THE INVENTION

Figure 1:
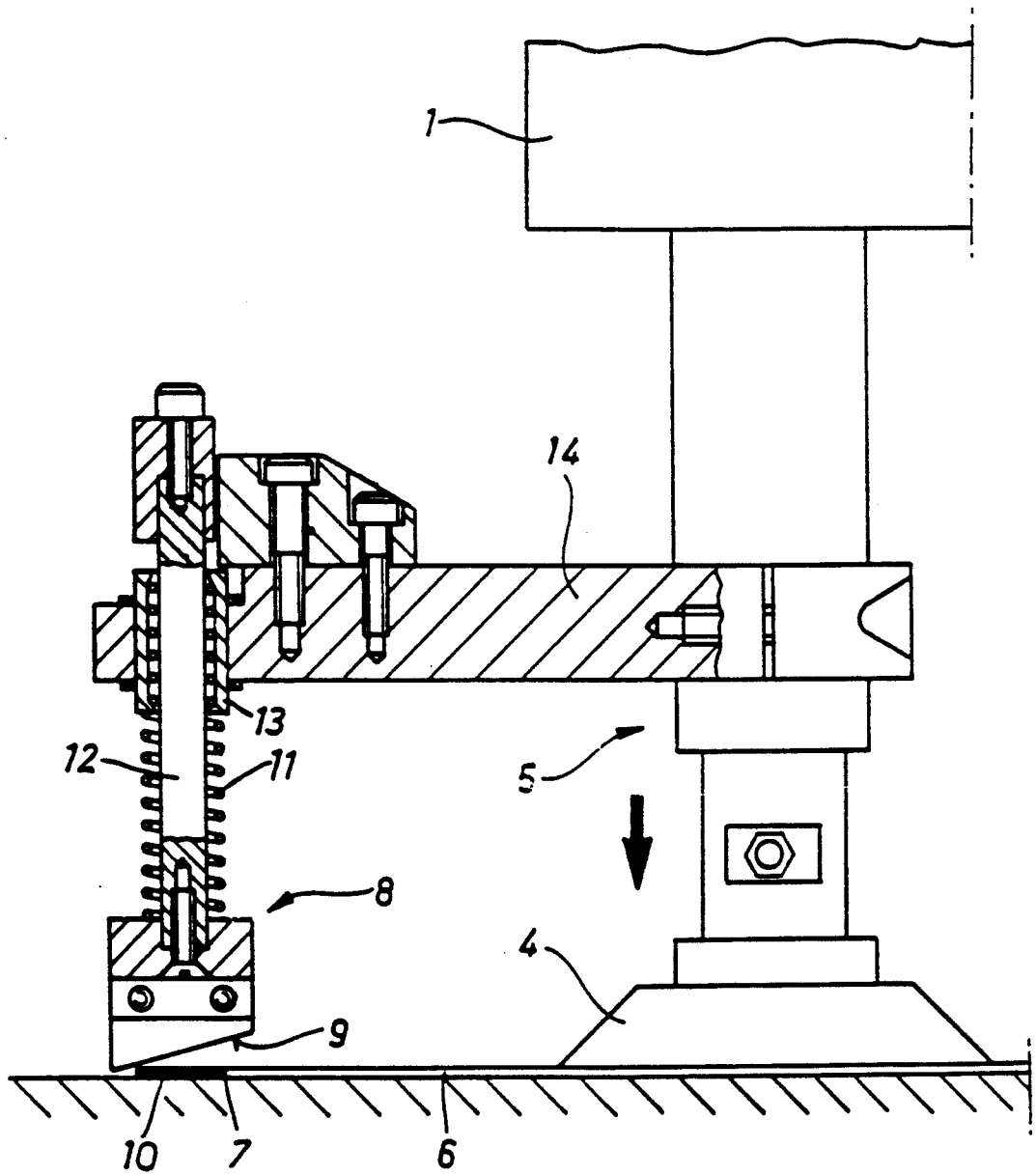
FIG. 1 illustrates a mechanical cut-off means included in an edge-removing apparatus of the invention and connected to the suction-pad rod of a conveyor carriage. The apparatus is shown at the first removing stage with a flame heating applied to a marginal zone 10 to be removed.
Figure 2:
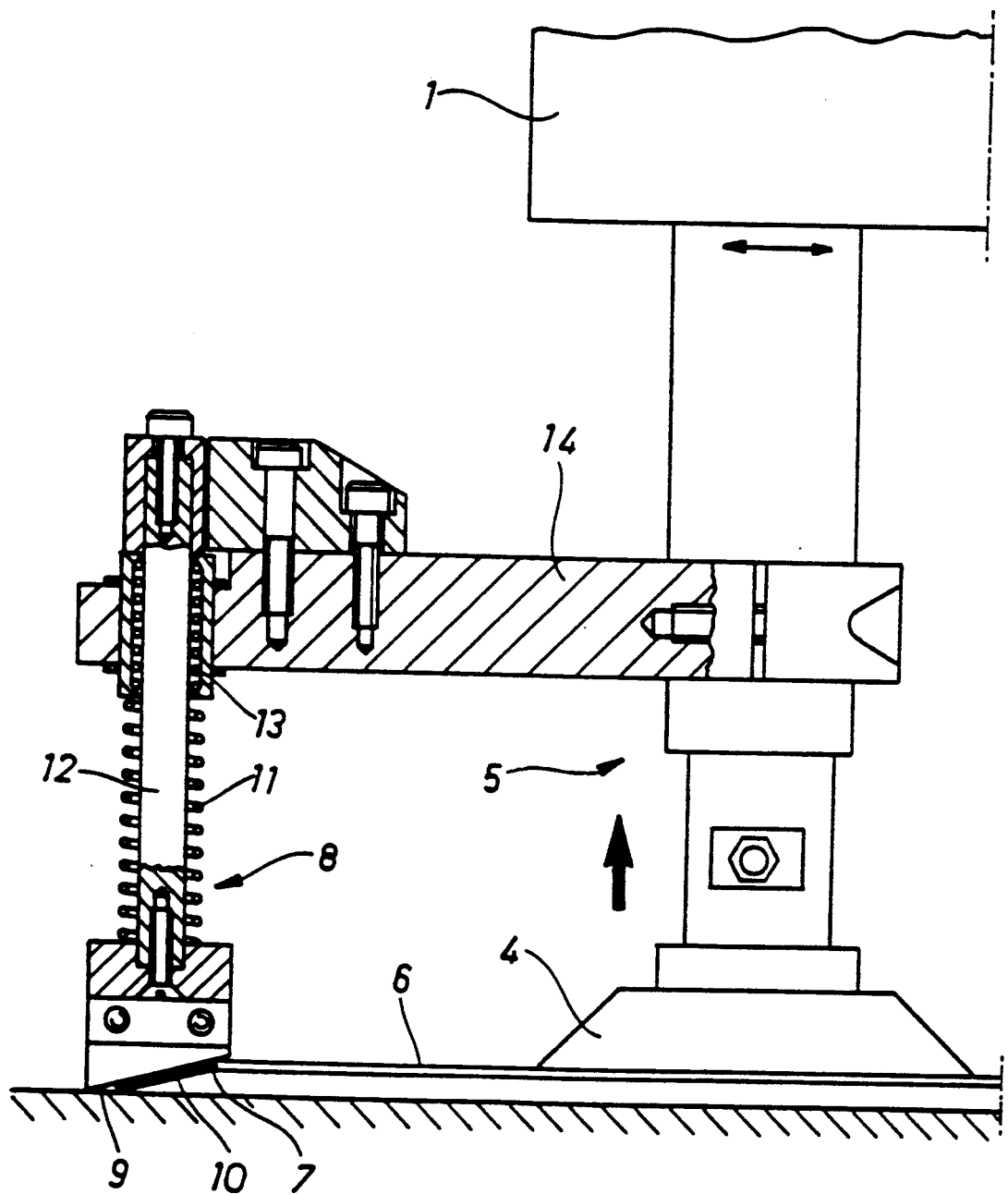
FIG. 2 shows the apparatus of FIG. 1 at the second removing stage with mechanical cut-off means 8 colliding against a possibly non-removed marginal zone 10 for removing it from a glass sheet 6.
Figure 3:
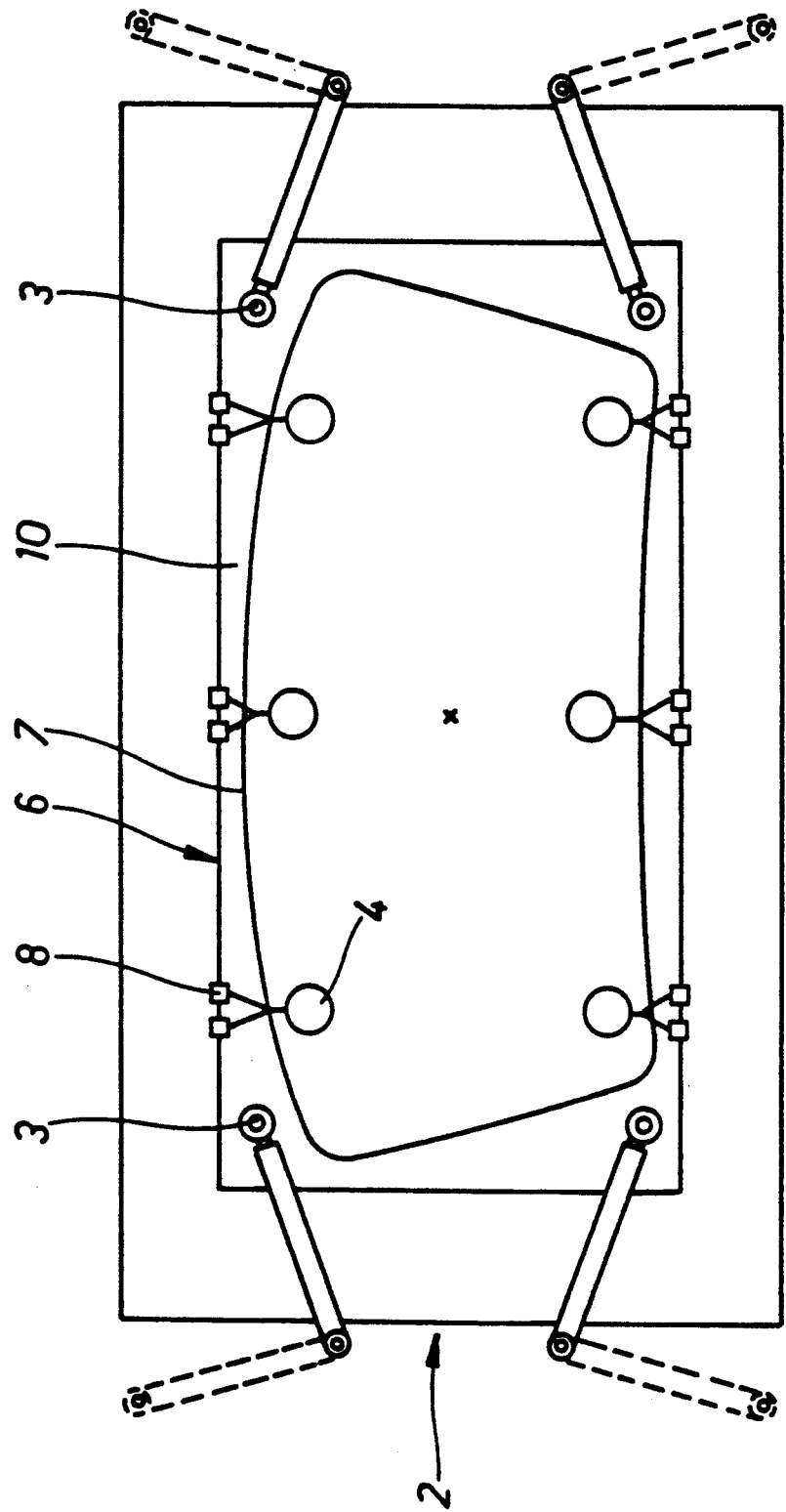
FIG. 3 shows an edge-removing station 2 in a schematic plan view.

A method and apparatus of the invention can be applied e.g. in the connection of an assembly described in FI Patent application 885048.

A conveyor carriage 1 fitted with suction pads 4 is used to remove the marginal zones of a glass sheet at to a marginal-zone removing station and, after the removal, to the sheet to an edge-grinding station (not shown). In the edge-cutting station, a rectangular glass sheet 6 is provided with a cut outline 7, whereby a marginal zone 10 remaining outside said outline is to be removed in an edge-removing station 2. In the edge-removing station, said glass sheet 6 is lowered, e.g., upon a grid-like base by descending a portion of carriage 1 having suction-pad rods 5 mounted thereon. This is followed by subjecting the four corners of glass sheet 6 to the action of heating flames by means of flame burners 3, the thermal stresses produced thereby removing and crushing said marginal zone 10 external of outline 7. However, along the long sides of glass sheet 6, the long and narrow marginal zones 10 do not always come loose. In this invention, the removal thereof is secured by means of mechanical removing members 8 which are mounted on rods 5 of suction pads 4 by means of horizontal brackets 14. Thus, the removing members 8 are spaced a certain horizontal distance from suction pads 4. As the size of a glass sheet changes, the location of suction pads 4 is adjusted by displacing suction-pad rods 5 in horizontal direction and, thus, said removing members 8 are also automatically carried to a correct location within the boundaries of a marginal zone 10 to be removed. Any conventional mechanism can be provided to horizontally adjust the rods 5, such as a rotary screw 20 which is carried by the carriage 1 and threadedly connected in a threaded hole 22 at the upper end of the rod. By rotating the screw 20, the associated rod 5 is displaced horizontally relative to the carriage 1.

A spring 11 urges said removing members 8 downwards. A rod 12 is movable through a linear bearing 13, whereby said removing member 8 can be urged upwards against the force of spring 11.

The cut-off head of a removing member 8 is provided with a bottom surface 9 bevelled to rise from inside towards outside, whereby the removing member 8 does not require exactly precise positioning in lateral direction.

When a glass sheet 6 is laid upon the base of an edge-removing station, said removing members 8 collide with the base and rise upwards against the force of spring 11 (FIG. 1). This is followed by a heating shock effected by flame burners 3 for breaking and removing the marginal zone 10. However, along the long sides there may remain unremoved edge portions if the zone 10 to be removed is narrow. This is followed by lifting the carriage 1 thereby producing a lifting of glass sheet 6 by means of suction pads 4. The tension of spring 11 prevents removing members 8 from rising along, the possibly unremoved edge portions 10 striking against said inclined bottom surfaces 9 of removing members 8 for detaching said marginal zone 10 along outline 7. The glass sheet is ready to be carried to an edge-grinding station.

It is obvious that the invention is not limited to the above preferred embodiment but many modifications of the invention are conceivable within the scope of the annexed claims. For example, the relative movement of removing members 8 and suction pads 4 can be arranged in a variety of ways.

We claim:

1. A method of removing a marginal zone of a glass sheet from an inner zone thereof, comprising the steps of:

cutting an outline in a glass sheet to define an inner zone of the glass sheet located inside of the outline, and a marginal zone of the glass sheet located outside of the outline;

positioning the glass sheet on support surface means such that both said inner zone and said marginal zone are supported from below by said support surface means;

arranging a carrier carrying suction pads and mechanical removing means such that said suction pads adhere to the inner zone of the glass sheet, and a bottom surface of said mechanical removing means contacts an outer edge of the marginal zone, said bottom surface being beveled and extending downwardly so that a lowermost end thereof is situated outwardly relative to an innermost end thereof, said removing means and said suction pads being capable of relative movement upwardly and downwardly;

heating the marginal zone by means of a flame burner to at least partially remove the marginal zone from the glass sheet; and raising said carriage to move said suction pads and inner zone upwardly relative to said bottom surface of said removing means whereby said bottom surface restrains upward movement of the outer edge of the marginal zone, causing the marginal zone to break along said outline and be removed from said inner portion.

2. A method according to claim 1, wherein said lowering step further includes effecting contact between the outer edge of the marginal zone and said bottom surface of said mechanical removing means at a location intermediate said lowermost and uppermost ends of said bottom surface.

* * * * *